(No Model.)

A. W. FINLAYSON.
PIPE COUPLING.

No. 588,411. Patented Aug. 17, 1897.

WITNESSES
Horace R. Wheeler
O. B. Barnziger

INVENTOR
Alexander W. Finlayson
By R. R. Wheeler & Co.
Attorneys.

UNITED STATES PATENT OFFICE.

ALEXANDER W. FINLAYSON, OF DETROIT, MICHIGAN.

PIPE-COUPLING.

SPECIFICATION forming part of Letters Patent No. 588,411, dated August 17, 1897.

Application filed August 17, 1896. Serial No. 602,977. (No model.)

*To all whom it may concern:*

Be it known that I, ALEXANDER W. FINLAYSON, a citizen of the United States, residing at Detroit, in the county of Wayne, State of Michigan, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in pipe-couplings; and it consists in a certain construction and arrangement of parts, as hereinafter fully set forth, and pointed out particularly in the claim.

The object of the invention is to produce a union joint or coupling for uniting sections of hose or piping in which the construction is such as to provide a secure and rigid joint in which both parts thereof are firmly held against a possible expansion or contraction, thereby obviating a loosening of the joint by varying temperature and insuring a perfectly tight joint under all conditions. This object is attained by the association of parts illustrated in the accompanying drawings, in which—

Figure 1:
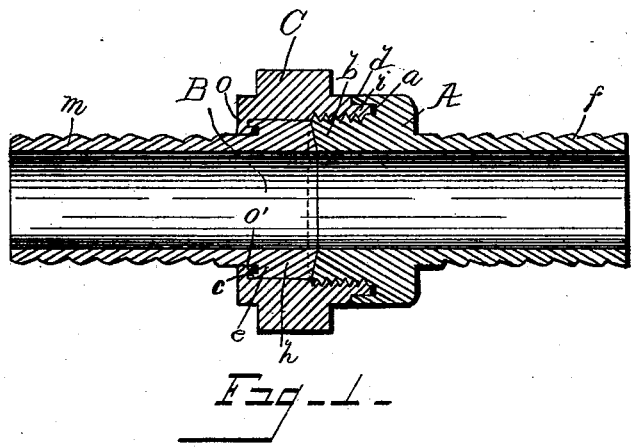
Figure 2:
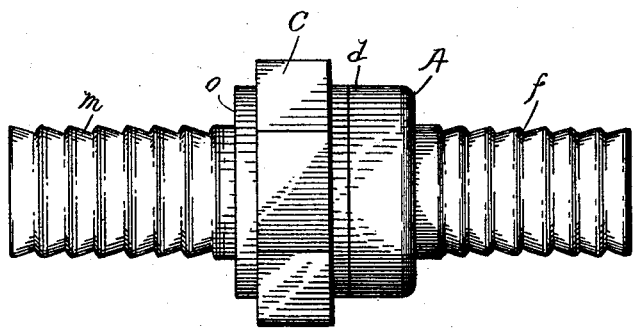

Figure 1 is a central longitudinal section through the coupler. Fig. 2 is a view in elevation showing the coupler for uniting the ends of two sections of hose.

Referring to the letters of reference, A designates one of the parts of the coupler, which is provided with a central aperture therethrough and an externally-threaded end portion $b$, also with a laterally-extending flange $d$ at the termination of said external threads, provided with an annular recess adjacent to said threads having a suitable gasket $a$ therein, and with an extended shank $f$. The corresponding part B of the coupler has likewise a central aperture, an extended end portion $h$ without threads, a shoulder $e$ at the termination of said extended end portion, having an annular recess that receives a gasket $c$, and an extended shank $m$.

C designates the locking-collar, which embraces the part B of the coupling and is internally threaded at one end to screw over the externally-threaded end portion of the part A of the coupling and unite the adjacent ends of said parts, said collar being provided at one end with an extended annular flange $i$ and at the opposite end with an inner diametrical shoulder $o$, having an internal annular flange $o'$. This collar is normally mounted upon the shank of the part B of the coupling.

In the application of this improved coupling to effect a union between the ends of two sections of hose or pipe the ends of said hose or pipe sections are secured to the respective shanks of the parts A and B of said coupling. The uniting ends of said parts are ground, the part A being concave and the part B convex, so that said ends fit closely together and are held in alinement. The collar C is then screwed onto the end of part A, as shown in Fig. 1, thus firmly uniting said parts, the flange $i$ of said collar at one end bearing against the gasket $a$, and the flange $o'$ at the opposite end bearing against the gasket $c$ in the recess of the shoulder $o$. When the collar C shall have been screwed onto the part A until it is locked by the engagement of its shoulder $o$ with the shoulder $e$ of the part B, it may chance that said parts may not be drawn tightly together. Therefore by turning the part A slightly it may be screwed into the collar, thereby still further compressing the gasket $a$ as well as the gasket $c$, thus making a tight joint between the ends of the couplings and at $a$ and $c$. In this construction it will be seen that the gaskets are not relied upon alone to make the joint, as the parts of the coupling are firmly united by the threads of the collar C, and should said gaskets become shrunken or worn in time the joint will not leak, as the threads of the coupled parts will corrode sufficiently to hold the joint perfectly tight. This is of great advantage in many uses and especially where the coupling is exposed to extreme degrees of temperature.

Having thus fully set forth my invention, what I claim as new, and desire to secure by Letters Patent, is—

In a pipe-coupling, the combination of the coupling parts A and B having the opposed ends one of which is externally threaded, the part A having the lateral flange with a recess in the face thereof, the part B having a raised shoulder provided with an annular recess therein, the internally-threaded collar screwed from the part B onto the part A uniting said parts and having at each end a flange which enters said recesses in said parts.

In testimony whereof I affix my signature in presence of two witnesses.

ALEXANDER W. FINLAYSON.

Witnesses:
E. S. WHEELER,
HORACE R. WHEELER.